United States Patent Office 3,598,782
Patented Aug. 10, 1971

3,598,782
STABILIZATION OF BUTADIENE-STYRENE CO-POLYMERS WITH SUBSTITUTED XYLYLENE DI-AMINES
Joseph A. Beckman and Edward L. Kay, Akron, Ohio, assignors to The Firestone Tire & Rubber Company, Akron, Ohio
No Drawing. Filed June 16, 1969, Ser. No. 833,681
Int. Cl. C08f 45/60
U.S. Cl. 260—45.9                            4 Claims

ABSTRACT OF THE DISCLOSURE

N,N'-bis-substituted, N,N,N'-tris-substituted and N,N,N',N'-tetra-substituted xylylenediamines and unvulcanized, rubbery interconnected stereo-linear polymers stabilized therewith.

---

This invention relates to N,N'-disubstituted xylylenediamines and their use as stabilizers for unvulcanized rubbery interconnected homopolymers of conjugated dienes of 4 and 5 carbon atoms and copolymers thereof with olefins, and more particularly rubbery interconnected copolymers of butadiene and styrene, and especially the oil-diluted, interconnected (or jumped) polymers.

The term "polymer" is used herein to include homopolymers and copolymers.

The stabilizers of this invention are xylylenediamine derivatives. They include N,N'-disubstituted, N,N,N'-tri-substituted, and N,N,N',N'-tetrasubstituted xylylenediamines in which the substituents are from the class of alkyl groups of 1 to 20 carbon atoms, cycloalkyl groups of 4 to 12 carbon atoms; phenyl, tolyl, naphthyl and alkaryl and aralkyl groups in which such alkyl and aryl groups are joined; and groups in which the nitrogen atoms of the xylylenediamine molecules are members of heterocyclic rings such as morpholine, piperidine, and piperazine, etc. Commercially, mixed para- and meta-derivatives of the formula

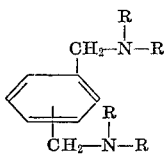

will be used, although either isomer may be used alone. Such stabilizers include:

N,N'-bis(methyl)xylylenediamine
N,N'-bis(ethyl)xylylenediamine
N,N'-bis(t,t-octyl)xylylenediamine
N,N'-bis(isopropyl)xylylenediamine
N,N'-bis(n-butyl)xylylenediamine
N,N'-bis(1-methylpentyl)xylylenediamine
N,N'-bis(dimethylbutyl)xylylenediamine
N,N'-bis(dimethylpentyl)xylylenediamine
N,N'-bis(decyl)xylylenediamines
N,N'-bis(dodecyl)xylylenediamines
N,N'-bis(1-methylphenyl)xylylenediamine
N,N'-bis(4-methylphenyl)xylylenediamine
N,N,N'-tris(methyl)xylylenediamine
N,N,N'-tris(ethyl)xylylenediamine
N,N,N'-tris(isopropyl)xylylenediamine
N,N,N',N'-tetra(methyl)xylylenediamine
N,N,N',N'-tetra(ethyl)xylylenediamine
N,N,N',N'-tetra(isopropyl)xylylenediamine
N,N'-bis(1-naphthyl)xylylenediamine
N,N'-bis(phenyl)xylylenediamine
N,N'-bis(benzyl)xylylenediamine A preferred stabilizer is one in which the substituents are branched-chain alkyl groups of 3 to 8 carbon atoms, such as N,N'-bis(isopropyl)xylylenediamine
N,N'-bis(1-ethylbutyl)xylylenediamine
N,N'-bis(1-ethyl-3-methylpentyl)xylylenediamine
N,N'-bis(sec.-butyl)xylylenediamine
N,N'-bis(2-octyl)xylylenediamine
N,N'-bis(1,3-dimethylbutyl)xylylenediamine From 0.005 to 5 parts per hundred parts of polymer may be used, but generally from about 0.1 to 2 parts will be used. Less may be used when the stabilizer is mixed with another stabilizer.

Unvulcanized interconnected rubbery polymers are those in which the viscosity and molecular weight have been jumped or otherwise substantially increased by reaction of the initially produced linear polymer with a suitable reagent to increase the molecular weight and at the same time the branching of the polymer. One type of such reaction is exemplified by the reaction of silicon tetrachloride with a live polybutadiene produced by polymerization of butadiene in a non-aqueous system by means of a lithium-based catalyst (e.g., butyllithium or tetramethylene dilithium), the interconnected polymer containing a silicon atom in the center with four hydrocarbon polymer fragments extending therefrom to form a "star." Another type of such interconnecting reaction, termed "jumping," is exemplified by the procedure described by E. F. Engel et al., Rubber Age, December 1964, pages 410–415; any unsaturated rubbery polymer can be jumped by treatment with a two-part catalyst consisting of a Friedel-Crafts catalyst plus a cocatalyst, such as titanium tetrachloride and thionylchloride or ethylaluminum sesquichloride and water.

Another type of molecular-weight-increasing-reaction, or interconnecting (jumping) reaction, is exemplified by the reaction of an olefinically unsaturated rubbery polymer with a halogenated organic compound (e.g. ethylene dichloride) in the presence of a strong base (e.g. butyllithium) to produce a mixture of higher molecular weight rubbery polymers of branched construction, and, typically, exemplified by a mixture of polymers having a molecular weight distribution including the original molecular weight of the unreacted rubbery polymer to molecular weights of dimers, trimers, tetramers and higher polymers of the original rubbery polymer. All of these polymers of increased molecular weight contemplated by the invention have improved ability to accept diluting oil and possess good milling and extruding properties ("processing" properties) when extended with oil. From 10 to 100 parts of processing oil, or thereabout may be added to 100 parts of the polymer.

Difficulty has been experienced in stabilizing many oil-diluted rubbery polymers. The stabilizer of this invention provides excellent stabilization of unvulcanized oil-diluted interconnected rubbery polymers, i.e. an unvulcanized linear rubbery polymer which has been interconnected and oil diluted. The invention finds widest use in the stabilization of such copolymers of butadiene and styrene but is useful with other interconnected rubbery polymers, and particularly those derived from the polybutadienes, polyisoprenes and butadiene-isoprene copolymers of any stereo composition. Polymers suitable for use in the interconnecting reaction can be conveniently made by the methods of U.S. Pat. No. 3,317,918, for example.

Any of the oils commonly used in the dilution of rubbers can be employed, including particularly higher boiling petroleum fractions such as the commercially known naphthenic and aromatic mineral oils. In the dilution of rubbers with oils, about 37.5 parts of oil are customarily used with 100 parts of polymer, although the amount of oil can vary from 10 to 100 parts, more or less. The oil preferably is added to the polymer after the polymerization and interconnecting reactions are completed. The stabilizer can be added prior to the addition of the oil, it can be added with the oil, or it can be added soon thereafter.

The stabilizer is incorporated into the polymer in the usual manner. The stabilizing effect is recognized by the lessening of the decrease in the viscosity of the polymer on heat aging. The stabilizers are added to protect the polymer during storage and processing. The vulcanizates are useful wherever rubber vulcanizates have been employed, as in the manufacture of tires, hose, and a wide variety of products.

The polymer used in the tests recorded in the following table was prepared by reaction of $SiCl_4$ with live butadiene-styrene copolymer obtained through continuous non-aqueous polymerization utilizing butyllithium as a catalyst. A polymer cement-oil masterbatch was prepared containing 37.5 parts of processing oil per 100 parts of polymer, and the stabilizers of this invention were added to portions of the masterbatch to produce the samples for aging studies.

These masterbatch samples were desolventized on a drum drier. Each dried polymer masterbatch sample was milled to achieve homogeneity and samples of the appropriate size were cut from each of the milled polymers. A Mooney viscosity (ML/4/212° F.) determination was made on each sample prior to aging. Samples containing the various stabilizers were then aged in a forced air oven at 75° C. for various periods of time. The results obtained with the different stabilizers of this invention are recorded in the following table.

EXAMPLE

Preparation of mixed m- and p-isomers of N,N'-bis(1,3-dimethylbutyl)xylylenediamine The compound was prepared by reductive alkylation of 0.1 mole (13.6 g.) of the mixed m- and p-isomers of xylylenediamine in the presence of 0.2 mole (20.0 g.) of methyl isobutyl ketone. The reduction was carried out in 100 ml. of ethanol containing 1 ml. of acetic acid and 200 mg. of Adams catalyst in a Parr hydrogenation apparatus. The reduction was allowed to proceed until the theoretical amount of hydrogen (0.2 mole) was consumed. The catalyst was removed by filtration and the solvent was removed on a rotary evaporator. The resulting oil was dissolved in chloroform, washed with excess dilute sodium carbonate solution, followed by water washing. The solution was then dried, the solvent was removed and the product, mixed m- and p-N,N'-bis (4-methyl-2-pentyl) xylylenediamine, was distilled at reduced pressure to give an 84 percent yield of product, B.P. 150–155° C. at 0.25–0.35 mm. Hg.

Two series of test samples were prepared: (1) by pouring the cement onto a drum heated to 162° C. to evaporate the solvent and deposit the polymer on the drum as described previously and (2) by pouring the cement (polymer solution) into a steam-heated water bath with subsequent distillation of the solvent (water desolventized).

Tests were made on each of these polymers. In each series of tests, one sample without additive is used as a control, commercial stabilizer was added to a second sample, and 0.5 phr. of the foregoing stabilizer was added to a third sample. These samples were heated as above described for several days and the results are recorded in the following table.

TABLE.—PERCENT RETENTION OF MOONEY VISCOSITY (ML./4/212° F.) AFTER AGING

| | Days | | |
|---|---|---|---|
| | 1 | 2 | 3 |
| | Polymer samples were water desolventized | | |
| No stabilizer [1] | | 82.5 | |
| Commercial stabilizer | 90.9 | 89.4 | 83.3 |
| N,N'-bis(1,4-dimethylbutyl)xylylenediamine | 98.5 | 96.6 | 95.0 |
| | Polymer samples were drum dried | | |
| No stabilizer | 84.3 | 70.6 | 62.8 |
| Commercial stabilizer | 93.6 | 91.6 ] | 93.6 |
| N,N'-bis(1,4-dimethylbutyl)xylylenediamine | 100.0 | 96.0 | 94.2 |

[1] Average values for water desolventized polymer containing no stabilizer.

The methyl-substituted xylylenediamines can be similarly prepared from formaldehyde, the ethyl-substituted compounds from acetaldehyde, the isopropyl-substituted compounds from acetone, the butyl-substituted compounds from butanal, the methylpropyl-substituted compounds from methylethyl ketone, the 1,3-dimethylbutyl-substituted compounds from methyl isobutyl ketone, and the benzyl-substituted compounds from benzaldehyde, etc. The production of the di-, tri- and tetra-substituted compounds is controlled by using the proper ratio of aldehyde or ketone to xylylenediamine.

The stabilized oil-diluted polymers of the invention are useful in practically every instance in which conventional oil-diluted SBR, oil-diluted natural rubber and oil-diluted rubbery polymers have been useful, including, without limitation, use in pneumatic tire treads, sidewalls and carcass stocks. Also the stabilized polymers of the invention can be blended with other known polymers to provide useful commercial compositions for fabrication into useful shapes and articles. The stabilized polymers of the invention are advantageously blended with known rubbers (e.g., natural rubber, polybutadienes, polyisoprenes, butadiene-styrene copolymer, isoprene-isobutylene copolymer, polychlorprene, isoprene-styrene copolymer) with or without additional oils, for forming vulcanizates of great technical importance. The novel stabilized polymers are advantageously mixed with the known reinforcing carbon blacks to produce useful commercial stocks, which also can contain one or more additional rubbery polymers, and also can contain 5 to 100 phr. of additional oil or plasticizer. Sulfur and other known vulcanizing agents for natural rubber and the commercial synthetic rubbers are useful for forming vulcanizable stocks containing the novel stabilized polymer. Known methods of mixing, forming, fabricating and curing or vulcanizing compositions of natural and commercial synthetic rubbers are applicable to and useful with compositions containing the novel stabilized polymers of the invention. The novel polymers are especially useful in pneumatic tire tread, sidewall and carcass compositions, and the considerations of this paragraph are especially relevent to the use of the novel polymers in tires.

We claim:

1. Rubbery copolymer of butadiene and styrene, interconnected with silicon, the interconnected copolymer being extended with 10 to 100 parts of processing oil per 100 parts of copolymer, being unvulcanized and being stabilized with 0.005 to 5 parts per 100 parts of copolymer of stabilizer selected from the group consisting of N,N'-disubstituted, N,N,N'-trisubstituted and N,N,N',N'-tetra-substituted xylylenediamines, the substituents being selected from the group consisting of alkyl groups of 1 to 20 carbon atoms, cycloalkyl groups of 4 to 12 carbon atoms, phenyl, tolyl, naphthyl, alkaryl and aralkyl groups in which such alkyl and aryl groups are joined; and heterocyclic groups which include the nitrogen atoms of the xylylenediamine molecules of the group consisting of morpholyl, piperidyl and piperazyl.

2. The composition of claim 1 in which the stabilizer is N,N'-disubstituted xylylenediamine.

3. The composition of claim 1 in which the substituents in the stabilizer are branched alkyl groups of 3 to 8 carbon atoms.

4. The composition of claim 1 in which the stabilizer is a mixture of m- and p-N,N'-bis(1,4-dimethylbutyl) xylenediamine.

References Cited

UNITED STATES PATENTS

| | | | |
|---|---|---|---|
| 3,317,918 | 5/1967 | Foster | 260—83.7 |
| 3,436,370 | 4/1969 | Blumel | 260—45.9 |

FOREIGN PATENTS

| | | | |
|---|---|---|---|
| 821,404 | 10/1959 | Great Britain | 260—570.9 |
| 145,742 | 6/1962 | U.S.S.R. | 260—809 |

DONALD E. CZAJA, Primary Examiner

E. C. RZUCIDLO, Assistant Examiner

U.S. Cl. X.R.

260—33.6AQ, 83.7

PO-1050
(5/69)

UNITED STATES PATENT OFFICE
CERTIFICATE OF CORRECTION

Patent No. 3,598,782      Dated August 10, 1971

Inventor(s) Joseph A. Beckman and Edward L. Kay

It is certified that error appears in the above-identified patent and that said Letters Patent are hereby corrected as shown below:

Col. 5, line 15, "xylenediamine" should read

--xylylenediamine--

Signed and sealed this 18th day of July 1972.

(SEAL)
Attest:

EDWARD M. FLETCHER, JR.      ROBERT GOTTSCHALK
Attesting Officer      Commissioner of Patents